(12) United States Patent
Rydbeck et al.

(10) Patent No.: US 6,195,564 B1
(45) Date of Patent: *Feb. 27, 2001

(54) METHOD FOR AUTOMATICALLY ESTABLISHING A WIRELESS LINK BETWEEN A WIRELESS MODEM AND A COMMUNICATION DEVICE

(75) Inventors: Nils Rydbeck; Thomas M. Croft, both of Cary, NC (US)

(73) Assignee: Ericsson Inc., Research Triangle Park, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/933,982

(22) Filed: Sep. 19, 1997

(51) Int. Cl.⁷ ............................. H04Q 7/32; G06F 13/00
(52) U.S. Cl. ................. 455/557; 455/575; 455/466; 455/554; 370/335
(58) Field of Search .................. 455/557, 466, 455/313, 575; 370/335; 375/222; 709/206

(56) References Cited

U.S. PATENT DOCUMENTS

| | | |
|---|---|---|
| 5,533,019 | 7/1996 | Jayapalan . |
| 5,537,097 * | 7/1996 | Eriksson et al. ............ 340/825.02 |
| 5,596,318 * | 1/1997 | Mitchell ...................... 340/825.44 |
| 5,628,379 * | 5/1997 | Mahany et al. .................. 370/311 |
| 5,714,943 * | 2/1998 | Rasor ........................... 340/825.44 |
| 5,726,893 * | 3/1998 | Shuchman et al. ............. 364/449.7 |
| 5,862,474 * | 1/1999 | Kimball ........................... 455/418 |
| 5,878,038 * | 3/1999 | Willey ............................ 370/335 |

FOREIGN PATENT DOCUMENTS

| | | |
|---|---|---|
| 19614925A1 | 10/1997 | (DE) . |
| 0748 139A2 | 12/1996 | (EP) . |
| 97/24829 | 7/1997 | (WO) . |

OTHER PUBLICATIONS

International Search report dated Dec. 16, 1998.

* cited by examiner

Primary Examiner—Daniel S. Hunter
Assistant Examiner—Alan T. Gantt
(74) Attorney, Agent, or Firm—Burns, Doane, Swecker & Mathis, L.L.P.

(57) ABSTRACT

A first wireless link between a communication device and a wireless modem is automatically established, so that electronic messages can be easily and automatically transferred between the communication device and a data network via the first wireless link and a second link between the wireless modem and the data network. Each of the communication device and the wireless modem can automatically determine whether an electronic message is to be transferred. When one of the communication device and the wireless modem determines that an electronic message is to be transferred, the determining one of the communication device and the wireless modem sends a page signal to the other one of the communication device and the wireless modem. When the other one of the communication device and the wireless modem receives the page signal and responds, the first wireless link is established. The electronic message is then transferred between the communication device and the data network via the first wireless link and the second link. The communication device can be a portable computer such as a laptop computer, and the wireless modem can reside in a cellular or personal communication system (PCS) phone or the like.

26 Claims, 4 Drawing Sheets

METHOD FOR AUTOMATICALLY ESTABLISHING A WIRELESS LINK BETWEEN A WIRELESS MODEM AND A COMMUNICATION DEVICE

BACKGROUND OF THE INVENTION

The invention relates generally to the field of communications systems, and more particularly to a communication link between a device such as a computer and a wireless modem linked to a data network.

Electronic mail (e-mail), voice mail and facsimile (FAX) have become very popular communications services. In providing such communications it is desirable to improve the mobility of the end user: i.e., to allow the user to connect to a data network anywhere, anytime, without wires or cables. It is also desirable to enable the user to easily send and receive e-mail, voice mail and video mail messages, and to receive "info-casts". Info-casts provide information such as stock quotes, weather forecasts, and sporting scores, and are commercially available through such companies as Pointcast.

An early solution to the challenge of enhancing user mobility included attaching an internal or external modem to a portable computer such as a lap-top computer. This solution required the user to locate a telephone jack or other cable connection, and then physically connect the computer to the data network by attaching a cable between the modem and the telephone jack. However, physically connecting the computer to the data network is not always possible or desirable.

More recently, wireless modems, usually in the form of a Personal Computer Memory Card International Association (PCMCIA) card, have been introduced to allow users access to the Internet via cellular and personal communication system (PCS) networks. In some cases technology such as Cellular Digital Packet Data (CDPD) is used. FIG. 1 illustrates a typical configuration of this kind.

In FIG. 1, a laptop computer 100 having an internal PCMCIA card (not shown) connects to an Internet service provider 140. The PCMCIA card is linked to a wireless network 110 via a wireless link 105. The network 110 can be, for example, a cellular or PCS network, and is linked to a Public Switched Telephone Network (PSTN) 130 via a link 120, and the PSTN 130 connects to the Internet service provider 140. This arrangement allows electronic messages to be transferred between the laptop computer 100 and the Internet service provider 140.

Automatic retrieval and batch transmission of queued e-mail or voice mail messages generated "off-line" using a portable computer (i.e., when the computer was not connected to the data network) with a PCMCIA wireless modem are commercially available. Text-to-speech technology allows the user to create voice mail messages by typing a message into the portable computer.

Commercially available systems can automatically transfer electronic messages by providing a software program for the laptop computer 100 that, when started, automatically checks for new mail if a connection to an Internet service provider has been established. The software can also be configured to automatically and periodically check for new mail according to a predetermined schedule.

Electronic messages can be sent immediately or queued for later sending when the user's terminal is in contact with the data network. For example, any unsent but queued messages can be sent the next time the program checks for incoming messages. The benefits of such features to the user include reduced tedium and greater convenience.

The primary shortcoming of PCMCIA wireless modems is that they reside inside the portable computer. Therefore, even if the user wants to send or receive only voice, he must carry around the portable computer. To overcome this difficulty, users have little choice but to buy a separate wireless phone.

Users who buy a separate wireless phone and wish to connect it to a computer encounter still other difficulties. The most common approach, a direct-connect cable between the computer and the phone, requires the user to manually connect the cable each time access to a wireless data service network is desired. IR links between a mobile phone and a portable computer such as a notebook computer are commercially available and partially overcome this difficulty. However, such links require a clear line of sight transmission path which is not always available or convenient.

Furthermore, commercially available solutions do not provide for automatic resynchronization and reestablishment or reactivation of the wireless link when the computer and the phone are brought within range of the wireless link after having been outside the range of the wireless link. Accordingly, commercially available solutions fail to transfer electronic messages as the computer and phone move in and out of range of the wireless link or each other.

SUMMARY OF THE INVENTION

The invention solves the foregoing problems and provides other advantages by providing for a system and method for automatically establishing or activating a wireless link between a communication device and a wireless modem, so that electronic messages can be easily and automatically transferred between the communication device and a data network.

The invention is especially useful in the situation where the communication device and the wireless modem move in and out of range of the wireless link or each other.

After the wireless link between the wireless modem and the communication device has been established or activated, electronic messages are automatically transferred between the communication device and the data network. This message transfer is accomplished via the wireless link and a link between the wireless modem and a data network in a manner that can be transparent to the user.

In particular, when one of the communication device and the wireless modem determines that an electronic message is to be communicated, it sends a page signal to the other one of the communication device and the wireless modem. When the other one of the communication device and the wireless modem receives the page signal and responds, a first wireless link between the communication device and the wireless modem is established or activated. The electronic message is then transferred between the communication device and the data network using the established wireless link and a second link between the wireless modem and the data network. The second link between the wireless modem and the data network can include a PSTN.

The communication device can be, for example, a portable computer such as a laptop computer, and the wireless modem can reside in a wireless phone. Accordingly, the invention allows automatic transfer of electronic messages between a portable computer and a data network via a wireless phone, in a manner that is convenient and transparent to the user. In addition, the computer and the wireless phone are separately operable. The wireless phone can be a cellular phone, PCS phone, satellite phone, or other suitable wireless phone.

Additional features and advantages of the invention will become apparent from the following description of the preferred embodiment, taken in conjunction with the accompanying drawings. The accompanying drawings illustrate, by way of example, the principles of the invention.

DETAILED DESCRIPTION OF THE PREFERRED EMBODIMENT

Figure 1:
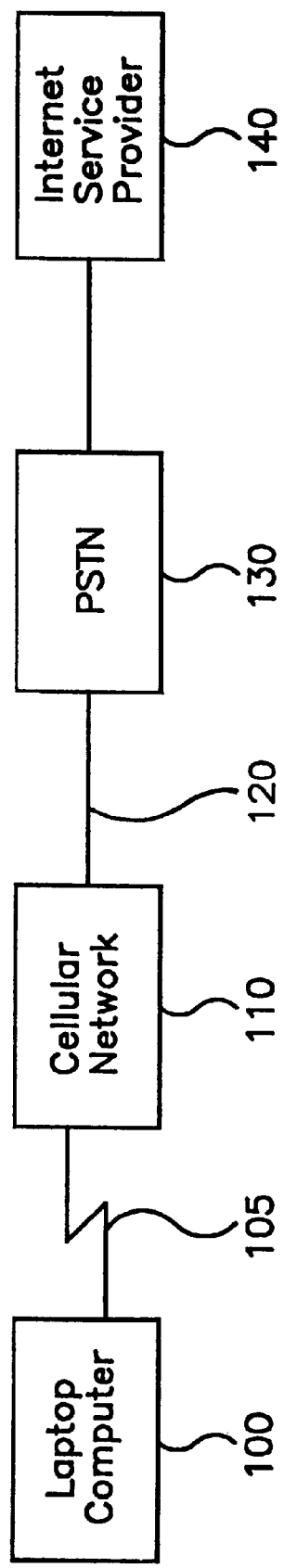
FIG. 1 is a block diagram of a conventional system connecting a personal computer to an Internet service provider.
Figure 2:
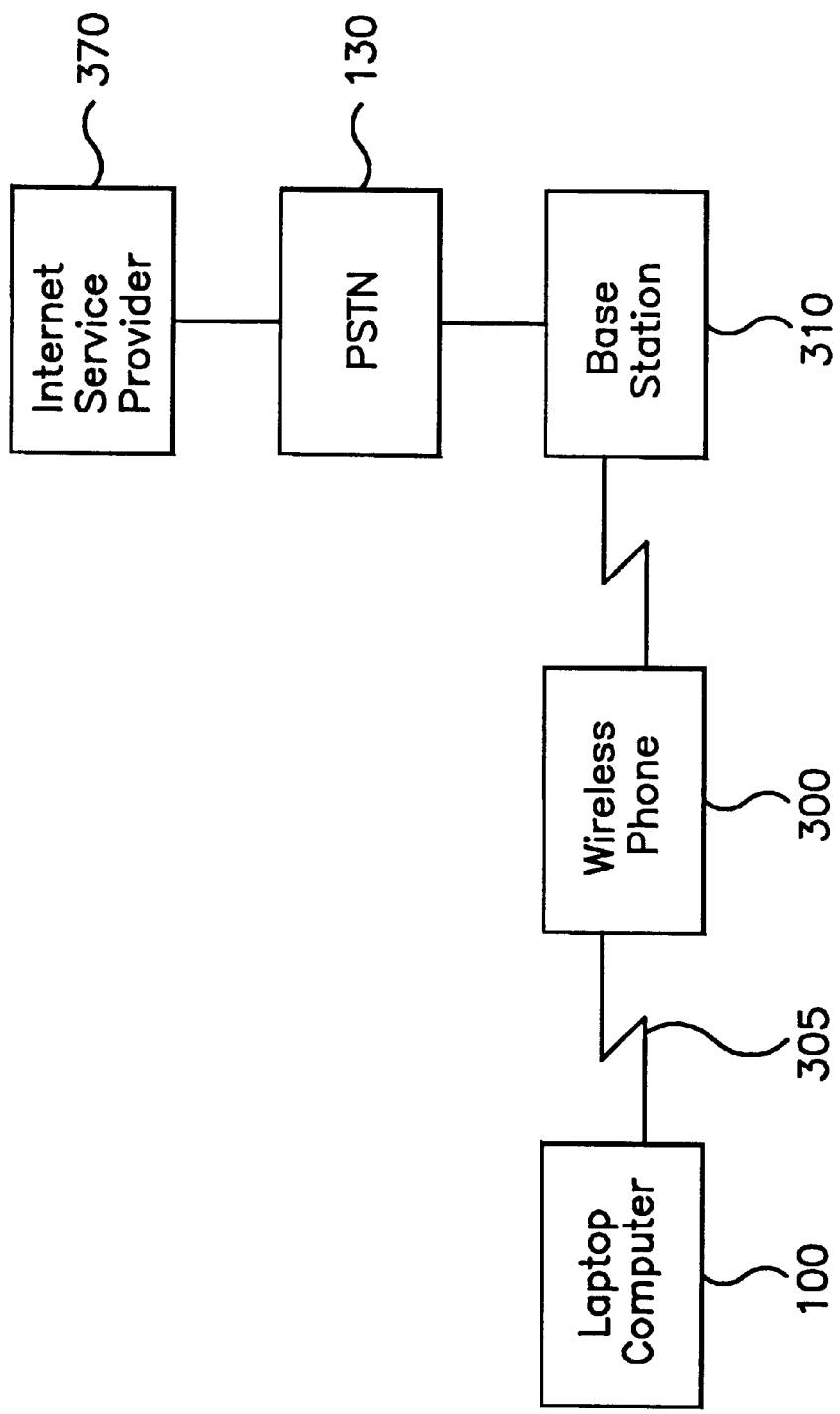
FIG. 2 is a block diagram of a system according to the invention that connects a portable computer to an Internet service provider.

FIG. 2 is a block diagram of a preferred embodiment of the invention, in which the communication device is a laptop computer 100 and the wireless modem is a wireless phone 300. As shown in FIG. 2, the laptop computer 100 communicates with the wireless phone 300 via a wireless link 305. The wireless phone 300 links to a base station 310, and the base station 310 connects to a data network such as an Internet service provider 370 via a PSTN 130. The wireless link 305 is preferably implemented using radio frequency signals in the 2.4 GHz range, but can also be implemented using, for example, lower frequency signals.

Those skilled in the art will recognize that the wireless link 305 can be implemented using any one of a variety of publicly available communication protocols, which are not discussed in this document.

The following practical example will illustrate several aspects of the operation of the invention. A woman checks into a hotel and then goes out for the evening. She leaves a laptop computer in her hotel room and takes only a cellular phone to a restaurant. Later, she returns to the hotel room with the cellular phone. At some point after the woman's return to the hotel room, messaging application software residing on either the computer or the cellular phone triggers a request to check for new incoming messages according to the woman's selected options. For example, the woman may have configured the messaging application software to check for new incoming messages every 15 minutes. The device on which the messaging application software resides sends a page signal to the other device, and the two devices establish a wireless link. The cellular phone then dials the executive's messaging service access number and checks for new messages. Any new messages are then downloaded to the laptop computer via the cellular phone and the wireless link. In addition, if the laptop computer has queued messages to send, they are sent automatically from the laptop computer to the messaging service provider through the wireless link and the link between the cellular phone and the messaging service provider. The messages can be e-mail messages, voice mail messages, FAX messages, etc.

According to an aspect of the invention, the wireless link between the communication device and wireless modem is established or activated when one of the communication device and the wireless modem devices responds to a page signal sent from the other of the devices. Thereafter, the link between the wireless modem and the data network is established and electronic messages can then be transferred in a conventional fashion. When a messaging transaction is complete, the links are terminated and the communication device and the wireless modem return to default standby states.

A messaging transaction can include transfer of messages between the communication device and the Internet service provider. However, a messaging transaction can also occur in which no messages are transferred. For example, the Internet service provider can be contacted to discover whether there are messages to be transferred from the Internet service provider to the communication device. If there are no such messages, and if the communication device has no messages to transfer to the Internet service provider, then the messaging transaction is completed without transferring messages.

Precise details of the message transfer process after the wireless link has been established will be apparent to those skilled in the art, and are not discussed in detail in this document.

In the preferred embodiment of the invention, both the communication device and the wireless modem have the same default standby state. When the communication device is in the default standby state, the communication device does not send any signals to the wireless modem. The default standby state ends, for example, when the communication device determines that it should send a page signal to the wireless modem, or when the communication device receives a page signal from the wireless modem. When the wireless modem is in the default state, it performs in the same way with respect to the communication device. The default standby state is symmetrical with respect to both the communication device and the wireless modem for two reasons. First, as mentioned above, the messaging application software can reside on each device, meaning that either device could initiate establishment or activation of the wireless link by paging the other device, in a given message transfer or transaction. Second, the user may not always want to use the same device when manually initiating a message transaction. For example, where the communication device is a laptop computer and the wireless modem is a mobile phone, on some occasions a user might want to check for e-mail by issuing a command from a program on the laptop computer. On other occasions, the user may call the Internet service provider directly from the mobile phone to check for e-mail using the phone keypad. In the latter case, if there are messages to retrieve, the phone sends a page signal to the laptop computer to establish or activate the wireless link so that the messages can be transferred to the laptop computer.

According to another aspect of the invention, the default standby state of both the communication device and the wireless modem is a low power standby state, in which each device periodically or randomly and temporarily powers on its link transceiver to listen for page signals. A page signal can be, for example, an access code of the device being paged.

The user can control how the automatic message transactions are performed by configuring the messaging application software residing on one or both of the communication device and the wireless modem. I.e., the user can specify conditions that control performance of automatic messaging transactions. Logical choices for automatic retrieval of messages would be at power/boot up of the communication device, or periodically at a specified interval, for example every 10 minutes. The user can also configure the messaging application software to automatically send queued messages whenever it checks for incoming messages, as described further above.

Alternatively, the messaging application software can be configured to check periodically for queued messages to be sent from the communication device. If as a result of the check the software determines that queued messages exist and should be sent, then the software performs the steps necessary to complete the message transfer. The steps include, for example, paging the companion device to establish the wireless link. In yet another scenario, the data network notifies one of the communication device and the wireless modem that new messages exist, and the notified device responds by automatically paging the other device to establish the wireless link and initiate a message transfer. For example, the data network calls the wireless modem, and the wireless modem pages the communication device.

The communication device and the wireless modem can also be configured so that they synchronize to each other automatically, even when no messaging transaction has been requested by an application. This could be accomplished by having each device automatically attempt to page the other under specified conditions, for example on power up or at specific times or time intervals. According to an aspect of the invention, the user can specify the conditions. If no messaging transaction is needed, the two devices simply return to the standby state. Such an approach would create a system in which the two devices "recognize" each other's presence, even if there is no need for a messaging transaction at that moment. This configuration is generally less power efficient than the configuration where the wireless link between the communication device and the wireless modem is established or activated only when a messaging transaction is necessary.

Figure 3:
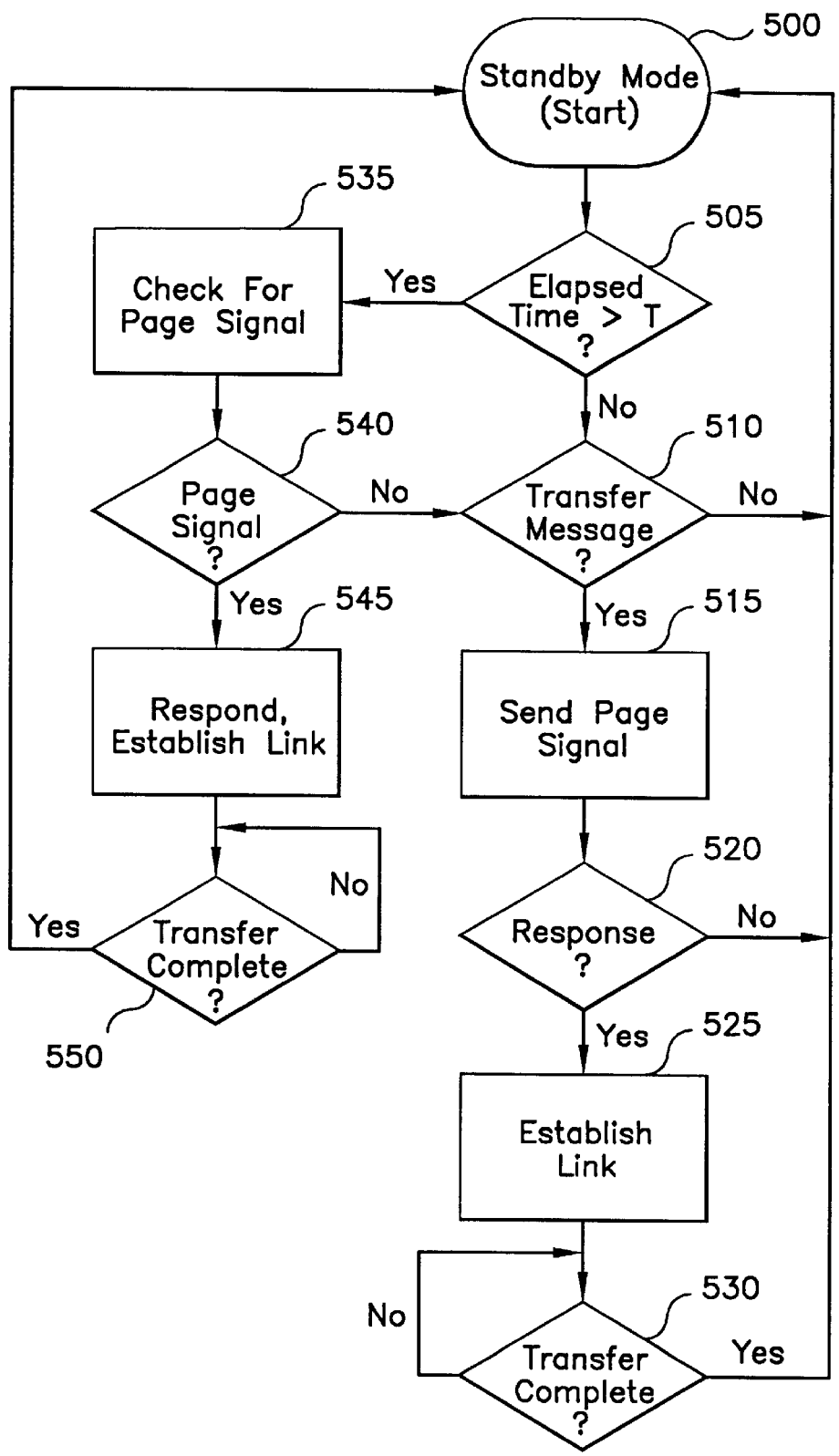
FIG. 3 is a first flowchart showing a process for establishing the wireless link between the portable computer and the wireless phone, according to an aspect of the invention.

FIG. 3 is a flowchart showing a method for establishing or activating the wireless link 410 between the laptop computer 100 and the wireless phone 300, according to an aspect of the invention.

In particular, the flowchart shown in FIG. 3 applies separately and equally to each of the laptop computer 100 and the wireless phone 300. Accordingly, the flowchart will be explained with respect to the laptop computer 100, with the understanding that the flowchart also describes similar functions of the wireless phone 300.

In step 500, the laptop computer 100 is in standby mode. From step 500, the method moves to step 505, where an elapsed time is checked. If the elapsed time is greater than a predetermined value T, then the method moves to step 535 where the laptop computer 100 checks for a page signal from the wireless phone 300. From step 535, the method moves to step 540 where the computer 100 determines whether the wireless phone 300 is sending a page signal to the laptop computer 100. If the phone 300 is sending a page signal to the computer 100, then the method moves to step 545, where the computer 100 responds to the page signal from the phone 300, a link is established between the computer 100 and the phone 300, and transfer of an electronic message commences. From step 545 the method moves to step 550, where the computer 100 determines whether the transfer commenced in step 545 is complete. The method remains at step 550 until the transfer is complete, and then the method returns to step 500 where the computer 100 goes into standby mode.

If in step 505 the predetermined time period has not elapsed, then the method moves to step 510. In step 510, the computer 100 determines whether an electronic message should be transferred. If in step 510 the computer determines that it is not necessary to transfer an electronic message, then the method returns to step 500 where the computer 100 goes into standby mode. If in step 510 the computer 100 determines that an electronic message should be transferred, then the method moves to step 515 where the computer 100 sends a page signal to the phone 300. From step 515 the method moves to step 520, where the computer 100 determines whether the phone 300 has responded to the page signal.

If the phone 300 has not responded to the signal, then the method moves from step 520 to step 500, where the computer 100 returns to the standby state. If the phone 300 has responded to the page signal, then the method moves from step 520 to step 525 where the link is established between the computer 100 and the phone 300, and transfer of an electronic message commences. From step 525 the method moves to step 530, where the computer 100 determines whether the transfer commenced in step 525 is complete. The method remains at step 530 until the transfer is complete, and then the method returns to step 500 where the computer 100 goes into standby mode.

If at step 540 the computer 100 determines that the phone 300 is not sending a page signal to the computer 100, then the method moves to step 510 and proceeds forward as described above.

Figure 4:
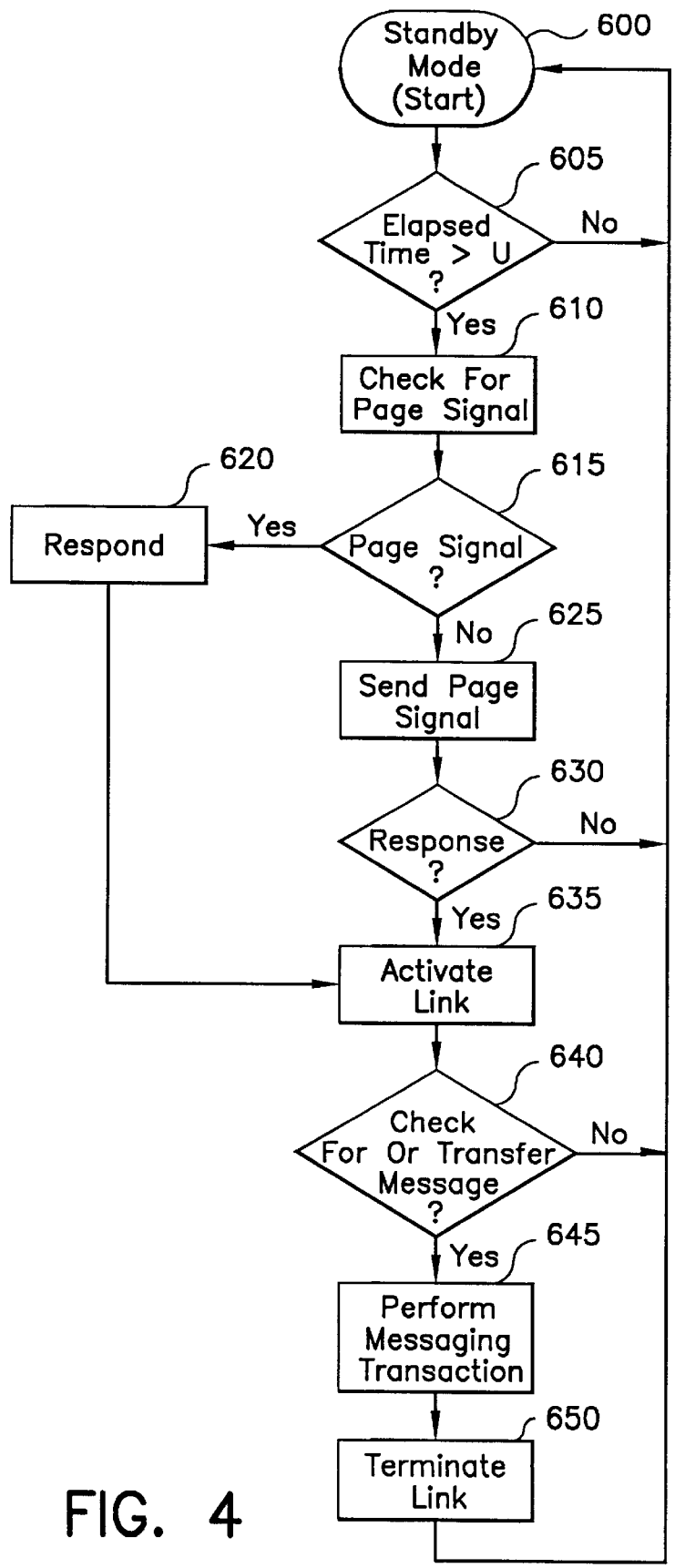
FIG. 4 is a second flowchart showing a process for establishing the wireless link between the portable computer and the wireless phone, according to another aspect of the invention.

FIG. 4 is a flowchart showing a method for establishing the wireless link 410 between the laptop computer 100 and the wireless phone 300, according to another aspect of the invention.

As with the flowchart of FIG. 3, the flowchart shown in FIG. 4 applies separately and equally to each of the laptop computer 100 and the wireless phone 300. Accordingly, the flowchart in FIG. 4 will be explained with respect to the laptop computer 100, with the understanding that the flowchart also describes similar functions of the wireless phone 300.

In step 600, the laptop computer 100 is in standby mode. From step 600, the method moves to step 605, where an elapsed time is checked. If the elapsed time is less than a predetermined value U, then the method moves from step 605 back to step 600, where the computer 100 returns to the standby state. If the elapsed time is greater than a predetermined value U, then the method moves to step 610 where the laptop computer 100 checks for a page signal from the wireless phone 300. From step 610, the method moves to step 615 where the computer 100 determines whether the wireless phone 300 is sending a page signal to the laptop computer 100. If the phone 300 is not sending a page signal to the computer 100, then the method moves to step 625 where the computer 100 sends a page signal to the phone 300. From step 625 the method moves to step 630, where the computer 100 determines whether the phone 300 has responded to the page signal.

If the phone 300 has not responded to the signal, then the method moves from step 630 to step 600, where the computer 100 returns to the standby state. If the phone 300 has responded to the page signal, then the method moves from step 630 to step 635 where the link is activated between the computer 100 and the phone 300. From step 635 the method moves to step 640, where a determination is made whether to transfer a message or check for a new message.

If in step 640 it is determined that neither a message transfer nor a new message check are to be performed, then the method moves from step 640 to step 600, where the computer 100 returns to the standby state. If it is determined that a message is to be transferred or checked for, then the method moves to step 645 and executes a messaging transaction, wherein operations that are necessary or appropriate to transfer or check for a message are performed. From step 645 the method moves to step 650. In step 650, the link between the computer 100 and the phone 300 is terminated, and the method moves from step 650 to step 600, where the computer 100 returns to the standby state.

If in step 615 the computer 100 determines that the wireless phone 300 is sending a page signal to the laptop computer 100, then the method moves to step 620 where the computer 100 responds to the page signal from the phone 300. From step 620 the method moves to step 635, and the method continues as described above.

The flowcharts of FIGS. 3 and 4 do not include details such as error messages, notification to the user, etc. that one skilled in the art will recognize can be included for cases where the paged device fails to respond, especially when the user has initiated the transaction manually and is waiting for a response.

Furthermore, those skilled in the art will recognize that the wireless link can be any one of a radio frequency link, an IR link, a magnetic link, an ultrasonic link, or other suitable wireless link. In addition, the communication device does not have to be a laptop computer, but can instead be a personal digital assistant (PDA) such as Apple Computer's Newton Message Pad, or some other suitable, specialized communication device. Those skilled in the art will recognize that the wireless modem can reside in any one of a variety of wireless phones. The wireless modem can reside, for example, in a cellular or PCS phone, or a different kind of mobile radio telephone, such as a satellite phone.

Those skilled in the art will also recognize that the wireless modem could reside in either the laptop computer or the wireless phone. For example, the wireless modem could reside in the laptop computer, and the phone could still be used via the wireless link to perform such functions as intelligent dialing.

It is possible to prevent the two communication devices (e.g., the laptop computer and the wireless phone) from transmitting page signals in situations where such activity is not desirable or is forbidden, for example aboard a commercial aircraft.

Although the invention has been described in detail with reference only to the presently preferred embodiment, those skilled in the art will appreciate that various modifications can be made without departing from the invention. Accordingly, the invention is defined only by the following claims which are intended to embrace all equivalents thereof.

What is claimed is:

1. A method for transferring electronic messages, comprising the steps of:
    monitoring at each of first and second communication devices for a paging signal from the other of the first and second communication devices, the paging signal indicating that a first wireless link between the first and second communication devices is desired, wherein during monitoring the first and second communications devices are each in a standby state that is symmetrical with respect to both the first and second communications devices;
    after receiving the paging signal, activating the first wireless link; and
    performing the messaging transaction, wherein the step of performing the messaging transaction comprises transferring at least one electronic message between the first communication device and a data network via the activated first wireless link and a second link between the second communication device and the data network.

2. The method of claim 1, further comprising the steps of determining within at least one of the first and second communication devices that a messaging transaction is to be performed; and
    sending the paging signal from the determining one of the first and second devices to the other one of the first and second communication devices.

3. The method of claim 2, further comprising the step of repeatedly sending the paging signal to the other one of the first and second communication devices until the other one of the first and second communication devices acknowledges the paging signal.

4. The method of claim 2, wherein the step of determining is performed based on conditions specified by a user.

5. The method of claim 2, wherein the step of determining is performed periodically.

6. The method of claim 2, wherein the step of activating the first wireless link is performed in response to the other one of the first and second communication devices receiving the paging signal from the determining one of the first and second communication devices and sending a response.

7. The method of claim 6, further comprising the step of terminating the first wireless link after the step of performing the messaging transaction.

8. The method of claim 1, wherein the at least one electronic message is stored in the first communication device.

9. The method of claim 1, wherein the second link comprises a public switched telephone network.

10. The method of claim 1, wherein the second link comprises a third wireless link.

11. The method of claim 1, wherein the at least one electronic message comprises at least one of an e-mail message, a voice mail message, a video mail message and a facsimile transmission.

12. The method of claim 1, wherein the step of performing the messaging transaction comprises determining whether at least one electronic message is to be transferred from a data network to the first communication device via the activated first wireless link and a second link between the second communication device and the data network.

13. The method of claim 1, wherein the second communication device comprises a wireless modem.

14. The method of claim 1, wherein the second communication device comprises a wireless phone.

15. The method of claim 1, wherein the first communication device comprises a laptop computer.

16. The method of claim 1, wherein the step of monitoring is performed periodically.

17. The method of claim 1, wherein the step of monitoring is performed based on conditions specified by a user.

18. A system for transferring messages, comprising:
    first and second communication devices; and
    monitoring means in each of the first and second communication devices for determining the presence of a paging signal and establishing a first wireless link between the first and second communication devices in response thereto, a messaging transaction being performed using the first wireless link and a link between the second communication device and a data network wherein the monitoring means in each of the first and second communications devices perform symmetrically with respect to the first and second communications devices.

19. The system of claim 18, wherein the first communication device comprises a portable computer.

20. The system of claim 18, wherein the second communication device comprises a wireless modem.

21. The system of claim 18, wherein the second communication device comprises a wireless phone.

22. The system of claim 18, wherein the monitoring means establishes the first wireless link in accordance with conditions specified by a user.

23. The system of claim 18, wherein the messaging transaction comprises transferring messages between the first communication device and the data network via the first wireless link and the second link between the second communication device and the data network.

24. The system of claim 18, wherein the monitoring means establishes the first wireless link when the first communication device determines that the messaging transaction is to be performed.

25. The system of claim 18, wherein the monitoring means establishes the first wireless link when the second communication device determines that the messaging transaction is to be performed.

26. A method for transferring electronic messages, comprising the steps of:

monitoring at each of a computer and a mobile phone for a paging signal from the other of the computer and the mobile phone communication, the paging signal indicating that a first wireless link between the computer and the mobile phone communication is desired, wherein during monitoring the computer and the mobile phone are each in a standby state that is symmetrical with respect to both the computer and the mobile phone;

in response to a command from a user, the mobile phone calling an Internet service provider to check for email messages pending for the computer;

determining whether at least one email message is pending at the Internet service provider for the computer;

in the event at least one email message is pending at the Internet service provider for the computer, performing the additional steps of a) automatically sending a paging signal from the mobile phone to the computer to activate a wireless link between the mobile phone and the computer; and b) transferring the at least one pending email messages from the Internet service provider to the computer via the mobile phone and the wireless link between the mobile phone and the computer.

* * * * *